(12) United States Patent
Morita et al.

(10) Patent No.: US 11,297,563 B2
(45) Date of Patent: Apr. 5, 2022

(54) COMMUNICATION APPARATUS, COMMUNICATION SYSTEM, COMMUNICATION CONTROL METHOD, AND PROGRAM

(71) Applicant: NEC Corporation, Tokyo (JP)

(72) Inventors: Yoichiro Morita, Tokyo (JP); Kayato Sekiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 16/954,693

(22) PCT Filed: Dec. 18, 2017

(86) PCT No.: PCT/JP2017/045379
§ 371 (c)(1),
(2) Date: Jun. 17, 2020

(87) PCT Pub. No.: WO2019/123523
PCT Pub. Date: Jun. 27, 2019

(65) Prior Publication Data
US 2020/0359309 A1 Nov. 12, 2020

(51) Int. Cl.
*H04W 48/18* (2009.01)
*H04L 12/46* (2006.01)

(52) U.S. Cl.
CPC ......... *H04W 48/18* (2013.01); *H04L 12/4625* (2013.01); *H04L 12/4633* (2013.01); *H04L 12/4641* (2013.01)

(58) Field of Classification Search
CPC ............... H04W 48/18; H04L 12/4625; H04L 12/4633; H04L 12/4641; H04L 41/28
See application file for complete search history.

(56) References Cited

U.S. PATENT DOCUMENTS

| | | | |
|---|---|---|---|
| 10,416,202 B1* | 9/2019 | Contario | G01R 19/145 |
| 2007/0083275 A1 | 4/2007 | Law et al. | |
| 2013/0177022 A1 | 7/2013 | Caffrey et al. | |
| 2015/0271017 A1* | 9/2015 | Seligson | H04L 45/16 370/254 |
| 2015/0271169 A1* | 9/2015 | Seligson | H04L 12/4645 726/4 |
| 2015/0295822 A1 | 10/2015 | Sella | |
| 2015/0341267 A1* | 11/2015 | Chiba | H04L 45/745 370/392 |
| 2017/0139393 A1 | 5/2017 | Boss et al. | |

(Continued)

FOREIGN PATENT DOCUMENTS

| | | |
|---|---|---|
| JP | 2003-018215 A | 1/2003 |
| JP | 2004-336501 A | 11/2004 |

(Continued)

OTHER PUBLICATIONS

International Search Report for PCT Application No. PCT/JP2017/045379, dated Mar. 3, 2018.

(Continued)

*Primary Examiner* — Julio R Perez
(74) *Attorney, Agent, or Firm* — Sughrue Mion, PLLC

(57) ABSTRACT

Regarding communication paths between first and second systems and an instrumentation system, a communication path(s) usable by the second system is set from a communication path(s) other than a communication path(s) used by the first system.

13 Claims, 10 Drawing Sheets

(56) References Cited

U.S. PATENT DOCUMENTS

2017/0171243 A1    6/2017  Ogawa et al.
2019/0013965 A1*   1/2019  Sindhu ................ G06F 13/4282

FOREIGN PATENT DOCUMENTS

| JP | 2007-219985 A | 8/2007 |
| JP | 2008-102920 A | 5/2008 |
| JP | 2008-191862 A | 8/2008 |
| JP | 2013-141227 A | 7/2013 |
| JP | 2015-035724 A | 2/2015 |
| JP | 2015-179925 A | 10/2015 |
| JP | 2015-201021 A | 11/2015 |
| JP | 2017-511068 A | 4/2017 |
| JP | 2017-091537 A | 5/2017 |
| JP | 2017-111540 A | 6/2017 |

OTHER PUBLICATIONS

Japanese Office Action for JP Application No. 2019-559887 dated Sep. 21, 2021 with English Translation.

* cited by examiner

COMMUNICATION APPARATUS, COMMUNICATION SYSTEM, COMMUNICATION CONTROL METHOD, AND PROGRAM

This application is a National Stage Entry of PCT/JP2017/045379 filed on Dec. 18, 2017, the contents of all of which are incorporated herein by reference, in their entirety.

FIELD

The present invention relates to a communication appliance, a communication system, a communication control method, and a program.

BACKGROUND

Generally, two input-output systems are connected to an instrumentation system using a programmable logic controller (PLC), etc. FIG. 1 schematically illustrates a typical example of an instrumentation system according to a related technique. In FIG. 1, a system 1 (1) designates system-mounted hardware and software. These hardware and software constantly perform information collection and command transmission in accordance with a predetermined condition(s), so as to observe an operating status of the instrumentation system and maintain a normal operation.

A system 2 (2) designates a hardware device and software connected to the system when, for example, a maintenance personnel or the like performs maintenance and inspection. These temporarily collect information and forward commands in accordance with instructions from the maintenance personnel or the like, in order to change setting of the instrumentation system or exchanges devices, for example. In the following description, the system 1 (1) and the system 2 (2) will be referred to as the system 1 and the system 2, respectively, without using reference numerals 1 and 2 in the drawings.

Input-output control polices of the systems 1 and 2 are different from each other as will be described below. The system 1 performs input-output processing that is constantly necessary for normal operation of the instrumentation system 3. For example, since system availability is of utmost importance, the input-output processing is maintained, even when some problem occurs, and basically, communication between the instrumentation system 3 and the system 1 is not blocked in principle.

The system 2 performs input-output processing that is necessary for temporary works and that is normally unnecessary. Since security for system protection, etc. is of importance, access control is performed so that access from the system 2 is temporarily permitted and normally blocked.

Network resources (hardware and software such as network switches) that provide communication path to inputs and outputs of the systems 1 and 2 are not necessarily independently provided, due to cost, capacity required for installation, etc. There is a case wherein the systems 1 and 2 share these network resources partially or entirely.

FIG. 2A illustrates a configuration example of the above case (FIG. 2A will also be referred to in the description of an Example Embodiment of the present invention). In the example in FIG. 2A, as a part of shared communication paths, a communication appliance 4 such as a network switch (simply referred to as a "switch") is shared by the systems 1 and 2. The shared communication paths may include inter-switch communication lines and communication nodes, for example. The following description assumes an example in which the communication appliance 4 is a switch, for the simplicity of the description.

The system 2 includes, for example, a maintenance terminal (a mobile information terminal, a personal computer (PC), or the like). When a maintenance operation is performed, the system 2 is connected to the switch 4, and adjustments are made such as for monitoring and parameter settings for on-site devices connected via PLCs or PLCs and field buses.

FIG. 2B illustrates an access control function of the switch 4 in FIG. 2A. While FIG. 2B illustrates a single switch 4 as an example only for the simplicity of the description, a plurality of switches may as a matter of course be included.

This access control function 5 of the switch 4 permits and blocks communication between systems 1 and 2 and the instrumentation system 3. The access control function 5 may be configured by a packet filter, for example. The access control function 5 performs control processing for, for example, permitting or blocking packets received by the switch 4, based on a rule(s) (also referred to as "a filter rule(s)") set in an access control list (ACL), for example. For example, In ACL, a rule is set for defining a condition that is matched against predetermined header information of a packet (frame) and an operation that is performed on the packet that match the condition (ACTION: for example, permitting or blocking (discarding) passage of the packet).

Regarding the access from the system 2, the switch 4 performs control processing for permitting or blocking packet forwarding to the instrumentation system 3 in accordance with a rule (access-lists #2 in FIG. 2B) set in an access control list (ACL), based on a security policy or the like, A plurality of rules having the same number may be set in an ACL, and a rule written earlier may have a higher priority level, for example. In this case, when the switch 4 receives a packet, the access control function 5 (a packet filter or the like) sequentially checks the rules in the ACL from the top and performs an operation corresponding to the condition that the received packet matches. When the received packet does not match any of the rules in the ACL, the received packet is blocked by implicit-deny (default-deny). Namely, any packet that is not explicitly permitted in the ACL is denied (this is referred to as a default-deny policy). In such an implicit-deny environment, when there are no rules in the ACL, the system 2 is virtually blocked from the network (the access from the system 2 to the instrumentation system 3 is blocked). Thus, with implicit-deny, no communication is permitted unless a security policy rule is written in the ACL. However, the setting may be changed to implicit-permit (default-permit) that permits any packet that is not explicitly specified.

In the example in FIG. 2B, in a normal operation, access control is performed based on an ACL 1, and all packets from the system 1 are permitted (access-list #1 permit any in FIG. 2B). The access from the system 2 is blocked. For example, numbers 198.14.1.1 and 198.14.2.1 of terminals (hosts) 1-1 and 1-2 in FIG. 2B represent the Internet protocol (IP) addresses of Internet protocol version 4 (IPv4) (however, the numerical values are imaginary values). Addresses other than those of IPv4 may, as a matter of course, be used as the addresses and the like (those of IPv6 or a protocol for the instrumentation system, for example).

In FIG. 2B, an ACL 2 is an example of an ACL that is set in the switch 4 in order to enable a maintenance operation on the instrumentation system 3 from the system 2. When a maintenance operation is performed, the switch 4 performs access control based on the ACL 2 to permit a packet from a terminal in the system 2 that is permitted by the access-lists #2. In the ACL 2, all packets from the system 1 are permitted. The ACLs in FIG. 2B illustrate, as an example, access control based on a source Internet protocol (IP) address, etc. of a packet. However, a port-based ACL that controls permission and blocking per port of the switch 4 may be used such as in a switch of layer 2 in the Open Systems Interconnection (OSI) reference model (seven layers). Alternatively, a VLAN-based ACL or the like that controls passage and permission on a per virtual local area network (VLAN) basis may be used.

In the system configurations illustrated as examples in FIGS. 2A and 2B, since the systems 1 and 2 share communication paths, the input-output control on the system 2, which is the maintenance system, could affect the system 1.

The input-output control processing on the system 2 should not affect the system 1 from a viewpoint of availability of the system.

Thus, a mechanism of preventing control processing on the system 2 from affecting the system 1 is needed. For example, there is demanded a mechanism of eliminating possibility that the system 1 is affected even when a partial failure of the devices such as the switch 4, the communication lines, etc. that provide a communication path(s), a port used by the system 2 becomes unusable, and the system 2 uses another port of the switch 4. Alternatively, when a maintenance personnel performs a maintenance operation, etc. by connecting a maintenance terminal in the system 2 to a port different from a port to which the maintenance terminal should be connected, it is preferable that access from the system 2 be blocked, from a viewpoint of elimination of a possibility to affect the system 1.

As described above, the switch 4 needs a mechanism of eliminating a possibility that connection of the system 2 to the switch 4 affects the system 1. For example, when an ACL in the switch 4 is manually rewritten, many man-hours are needed depending on the number of ports of the switch 4 or the number of switches 4 in the network. Thus, it is difficult to perform a prompt maintenance operation. In addition, since the network configuration needs to be grasped, it is difficult to verify that availability of the system 1 is not affected.

PTL 1 discloses a computer-implemented method for routing a new data stream from a source to a destination through a network including a plurality of forwarding devices interconnected with links.

This method includes:
(a) receiving, at a control device, a request to create a path through the plurality of interconnected forwarding devices for a new data stream;
(b) determining a type of the new data stream;
(c) determining, based on the determined type, historical usage characteristics of data streams having the determined type;
(d) determining, based on the historical usage characteristics of data streams having the determined type, the requested path through the plurality of interconnected forwarding devices from the source to the destination;
(e) for respective forwarding devices along the path, determining a routing table indicating which port of the forwarding device to route data from the new data stream along the path determined in (d); and
(f) for each of the respective forwarding devices, transmitting the routing table determined in (e) to configure the forwarding device In addition, PTL 2 discloses an integrated production system including a safety instrumentation system and an upper system that are connected via a network and that are separately arranged in mutually different zones. The integrated production system includes: detection means arranged per zone and detecting a cyberattack from outside on the zone on which the detection means is arranged; and protection means for limiting, based on a detection result obtained by the detection means, inter-zone communication or intra-zone communication.

However, neither PTL 1 nor 2 discloses means for preventing control on the system 2 from affecting the system 1, even when the systems 1 and 2 share a communication path(s).

PTL 1: Japanese National Publication of International Patent Application No. 2017-511068
PTL 2: Japanese Patent Kokai Publication No. JP2017-111540A

SUMMARY

As described above, a mechanism of preventing control on the system 2 from affecting the system 1 even when the systems 1 and 2 share a communication path(s) is needed. For example, there is demanded automatic setting of a mechanism of eliminating a possibility that the system 2 affects, for example, communication performance, operation characteristics, and availability of system 1 (capability that the system 1 can operate continuously) in a configuration in which the systems 1 and 2 can share a communication path(s).

Thus, the present invention has been made in view of the above problem, and it is an object of the present invention to provide an apparatus, a system, a method, and a non-transitory medium storing a program, each enabling to automatically set a mechanism of eliminating impact of connection of one system on a different system when a plurality of systems are connected to an instrumentation system via communication paths.

According to an aspect of the present invention, there is provided a communication appliance, including control means for configuring, regarding communication paths between first and second systems and an instrumentation system, a communication path(s) usable by the second system from a communication path(s) other than a communication path(s) used by the first system, based on a use history of the communication path(s) used by the first system.

According to an aspect of the present invention, there is provided a communication system, comprising: a communication apparatus including means for configuring, regarding communication paths between first and second systems and an instrumentation system, a communication path(s) usable by the second system from a communication path(s) other than a communication path(s) used by the first system based on a use history of the communication path(s) used by the first system; and means for holding the use history of the first system.

According to an aspect of the present invention, there is provided a communication control method, comprising:
configuring, regarding communication paths between first and second systems and an instrumentation system, a communication path(s) usable by the second system from a communication path(s) other than a communication path(s) used by the first system based on a use history of the communication path(s) used by the first system.

According to an aspect of the present invention, there is provided a program, causing a computer to perform processing comprising:

configuring, regarding communication paths between first and second systems and an instrumentation system, a communication path(s) usable by the second system from a communication path(s) other than a communication path(s) used by the first system based on a use history of the communication path(s) used by the first system.

According to the present invention, there is provided a non-transitory computer-readable recording medium such as a computer-readable recording medium holding the above program. Examples of the recording medium include a semiconductor memory (for example, a random access memory (RAM), a read-only memory (ROM), or an electrically erasable and programmable ROM (EEPROM), a hard disk drive (HDD), a compact disc (CD), and a digital versatile disc (DVD)).

Advantageous Effects of Invention

According to the present invention, a mechanism of eliminating impact of connection of one system on a different system when a plurality of systems are connected to an instrumentation system via communication paths can be set automatically.

DETAILED DESCRIPTION

Example embodiments of the present invention will be described. The present invention is applicable to a system configuration in FIGS. 2A, 2B, etc. According to an example embodiment of the present invention, the access control function 5 of the communication appliance 4 solves the problem described with reference to FIGS. 2A, 2B, etc. According to the example embodiment of the present invention, based on use history of communication paths used by the system 1, the communication appliance 4 in FIG. 2A configures, as a setting range for the system 2, a communication path(s) other than a communication path(s) used by the system 1 among usable communication paths. Namely, the communication appliance 4 prohibits the system 2 from using a communication path(s) used by the system 1 and configures a communication path(s) other than a communication path(s) used by the system 1 as a setting range for the system 2. This setting range may be constituted to perform access control which permits or deny access from the system 2.

Example Embodiment

Figure 2A:
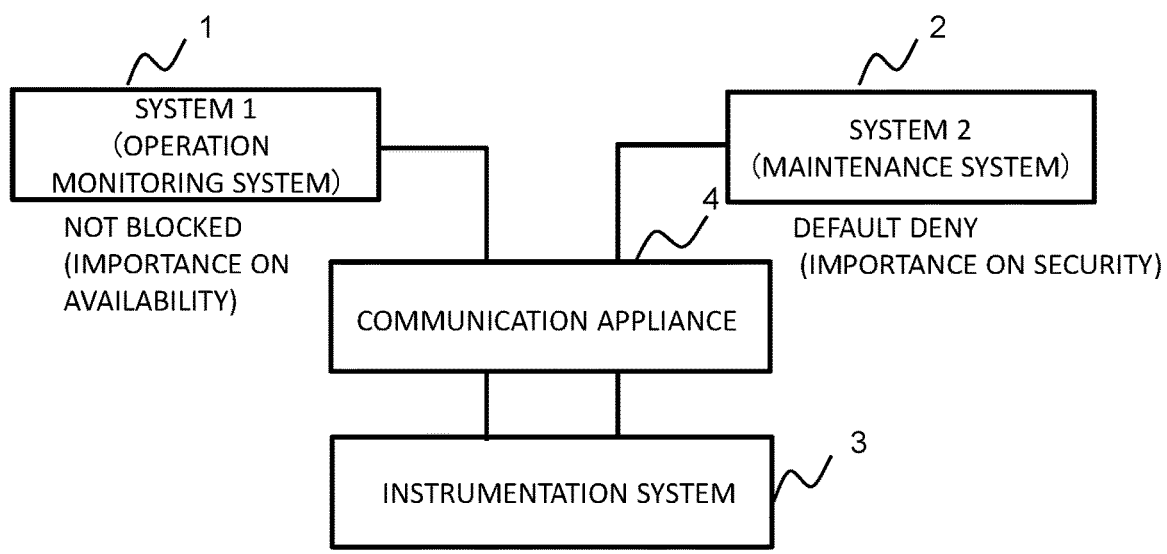
FIG. 2A a diagram illustrating a related technique and an Example Embodiment of the present invention.
Figure 2B:
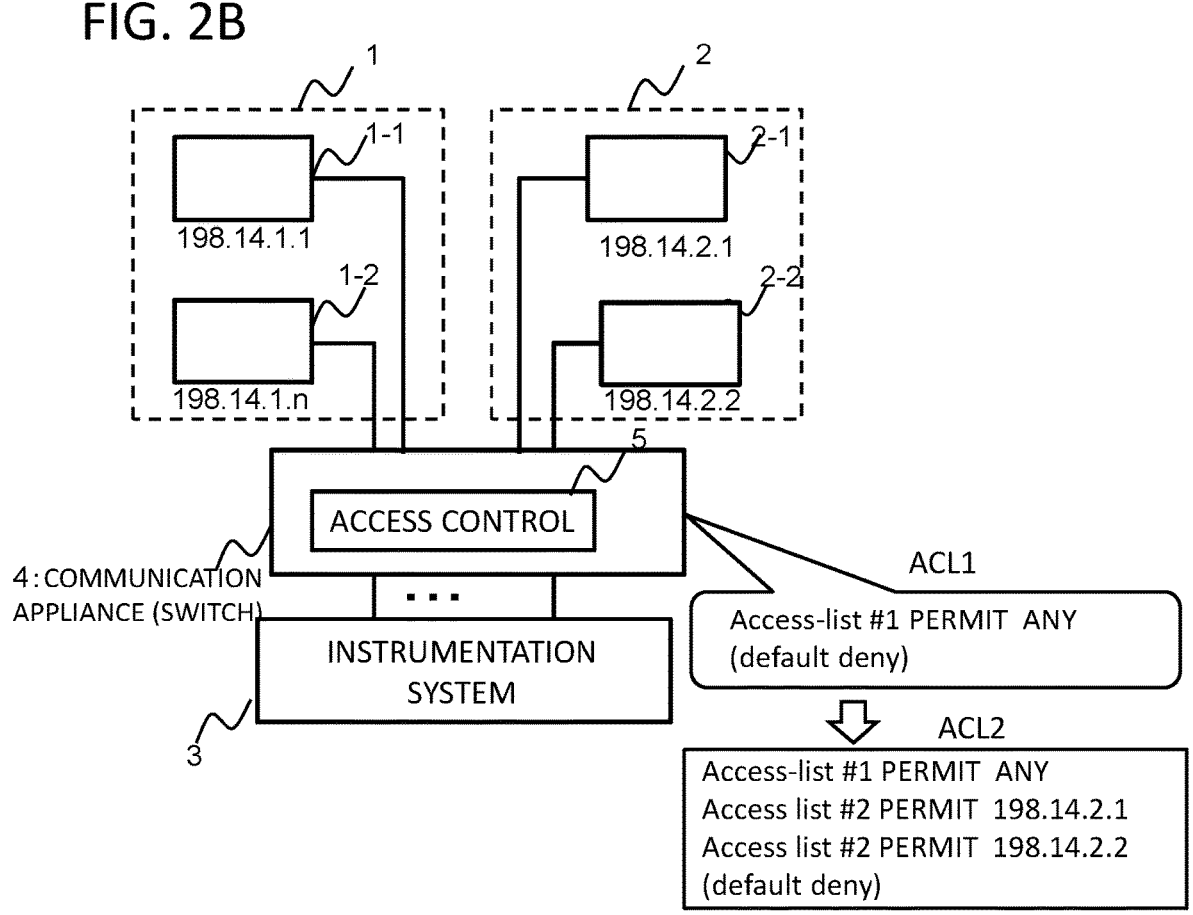
FIG. 2B a diagram illustrating a related technique.
Figure 3:
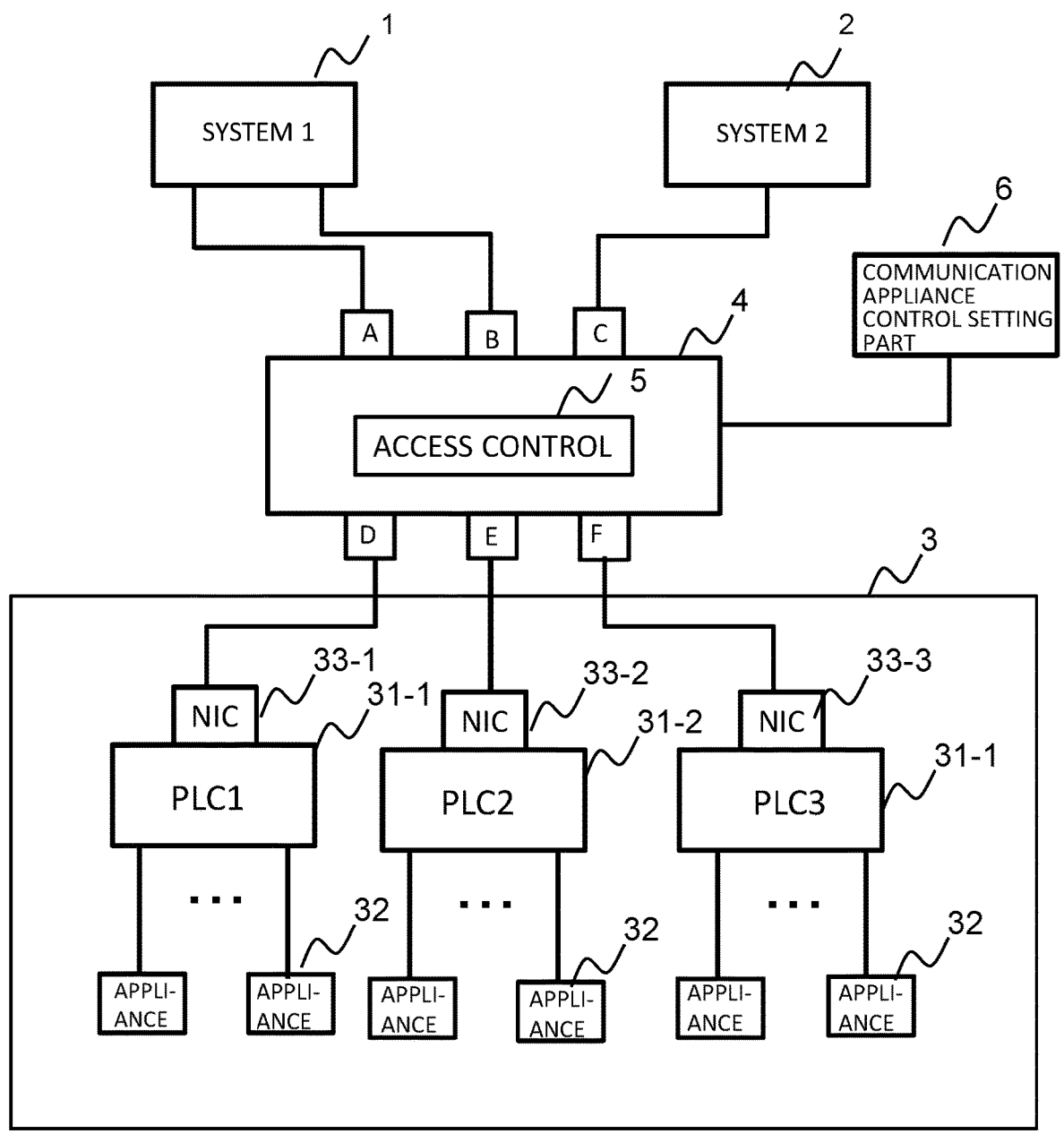
FIG. 3 a diagram illustrating an Example Embodiment of the present invention.

FIG. 3 illustrates an example embodiment of the present invention. Basically, FIG. 3 corresponds to the configuration in FIG. 2B. In FIG. 3, systems 1 and 2, a switch 4, and an instrumentation system 3 correspond to the systems 1 and 2, the communication appliance 4, and the instrumentation system 3 in FIGS. 2A and 2B. In FIG. 3, a communication appliance control setting part 6 sets the switch 4 so that the system 2 cannot use a communication path(s) (e.g., a port(s)) used by the system 1. The communication appliance 4 and the communication appliance control setting part 6 may be configured as a single unit or as separate units connected via communication means.

The instrumentation system 3 includes, as examples, three PLCs 1 to 3 (31-1 to 31-3) and appliances (field appliances) 32 connected thereto. The PLCs 1 to 3 (31-1 to 31-3) are connected to ports D to F of the switch 4 via network interface cards (NICs) 33-1 to 33-3, respectively. The switch 4 includes a table (a correspondence table (a MAC address table) including ports and media access control (MAC) addresses to which these ports connect) for determining a port(s) to which a received frame is forwarded. The switch 4 searches the MAC address table by using a destination MAC address of a received frame as a key and determines an output port. If no corresponding destination address is registered in the MAC address table, for example, the switch 4 outputs the corresponding frame to all the ports other than the received port (flooding). For example, the number of PLCs is as a matter of course limited to 3. The switch 4 may be connected to other devices. The switch 4 may be connected to devices from a PLC via bus connection based on a multi-drop method, a T-branch method, or a tree branch method. In addition, the number of switches 4 used in this configuration is one only for simplicity, but a plurality of switches 4 may be used.

Though not limited thereto, the switch 4 may perform access control per port (port of a layer-2 switch) (also termed as port-based ACL), for example.

In the above case, when traffic (frame) arrives at an individual port of the switch 4, the switch 4 can perform access control specified by an ACL per port. The communication appliance control setting part 6 sets an ACL in the switch 4. This ACL includes a rule indicating that access from the system 2 to a port(s) used by the system 1 among the ports provided in the switch 4 is not permitted. Thus, a mechanism for eliminating impact of connection of the system 2 on availability, etc. of the system 1 can be configured automatically.

Alternatively, the switch 4 may be configured to perform access control based on a port-based VLAN. Namely, a VLAN ID (Identifier) (VLAN number) may be assigned to an individual port of the switch 4, and access control per VLAN may be performed. In this case, when a packet (frame) arrives at a port of the switch 4, the switch 4 determines the VLAN number to which this packet (frame) belongs. If the VLAN number (VLAN ID) set in the port matches the VLAN number to which this packet (frame) belongs, the switch 4 forwards the packet (frame) to an output port (port having the same VLAN number). If the VLAN number to which the packet (frame) belongs does not match the VLAN number (VLAN ID) set in the port, the switch 4 discards the packet (frame).

The communication appliance control setting part 6 may assign and update the VLAN numbers of a port(s) in the switch 4, based on a history of the port(s) in the switch 4 used by the system 1. The switch 4 in FIG. 4 may assign, for example, ports A, B, D, and E as a VLAN of the system 1 and ports C and F as a VLAN of the system 2. In this case, the system 1, the ports A, B, D, and E of the switch 4, and nodes (for example, NICs 33-1, 33-2, etc.) of the instrumentation system 3 form a VLAN, and the system 2, the port C of the switch 4, and nodes (for example, the NIC 33-3, etc.) of the instrumentation system 3 form another VLAN 2. As a result, the system 2 cannot have an access to the VLAN 1.

Alternatively, when the switch 4 performs layer-2 relay processing, the switch 4 may perform access control based on a MAC address to which a port is connected. For example, when a maintenance terminal in the system 2 that is originally connected to the port C accesses the port B, since the maintenance terminal in the system 2 does not match the MAC address allocated to the port B, a frame transmitted from the maintenance terminal in the system 2 to the port B is discarded.

Alternatively, for example, a MAC address of an individual node in the system 1 connected to the switch 4 and MAC addresses of the NICs 33-1 and 33-2 of the PLCs 1 and 2 in the instrumentation system 3 may be included in a single VLAN, and MAC addresses of the maintenance terminal in the system 2 and the NIC 33-3 of the PLC 3 to which the maintenance terminal is connectable may be included in another VLAN. That is, the system 2 may be separated from the PLCs 1 and 2. In this case, even when the maintenance terminal or the like in system 2 makes an attempt to access the PLC 1 or 2, the switch 4 denies this access. The switch 4 discards a frame from the maintenance terminal or the like in the system 2 destined to the PLC 1 or 2 in the instrumentation system 3.

Alternatively, when the switch 4 performs layer-3 relay processing, as illustrated in the ACLs 1 and 2, in FIG. 2B, the switch 4 may perform access control based on a source IP address of a packet received by a port. In this case, the packet from a node having the source IP address may arrive at the switch 4 via another switch (e.g., a layer-3 switch), etc.

Figure 4:
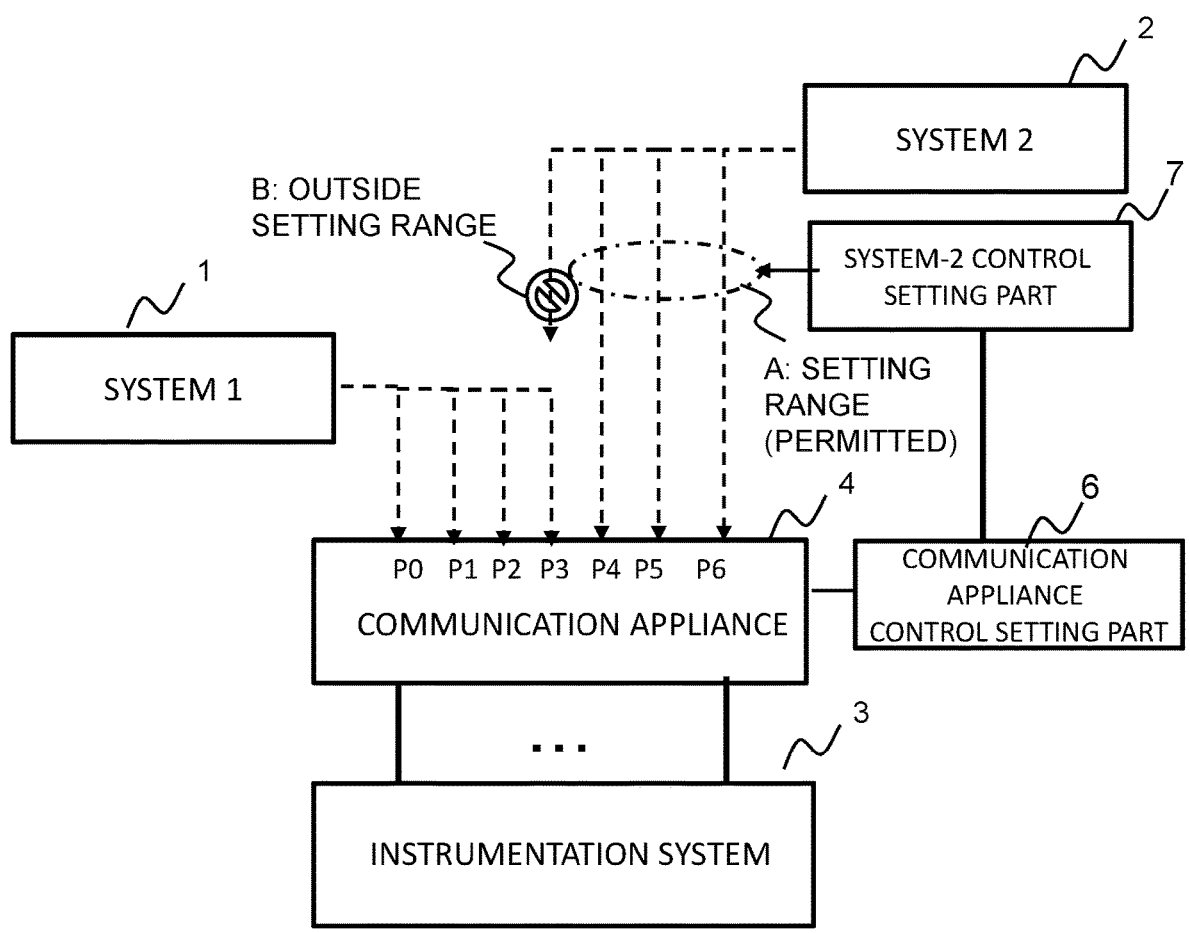
FIG. 4 a diagram illustrating an Example Embodiment of the present invention.

FIG. 4 illustrates an example embodiment of the present invention. As illustrated in FIG. 4, a system-2 control setting part 7 sets access control on the system 2. The system-2 control setting part 7 removes one or more communication paths that are being used or have been used by the system 1 from the setting range of the system 2. The setting range of the system 2 is a range in which access by the system 2 is permitted or denied, for example, depending on the convenience of the system 2, without affecting the system 1. The communication appliance control setting part 6 sets the communication appliance 4 so that the communication appliance 4 such as a switch can perform access control corresponding to the setting range usable by the system 2.

In FIG. 4, connection of the system 2 to the port P3 of the communication appliance 4 is not permitted. For example, when a maintenance terminal in the system 2 is connected to the port P3 of the communication appliance 4 and performs communication, a frame (packet) from the maintenance terminal in the system 2 is blocked (discarded).

Figure 5:
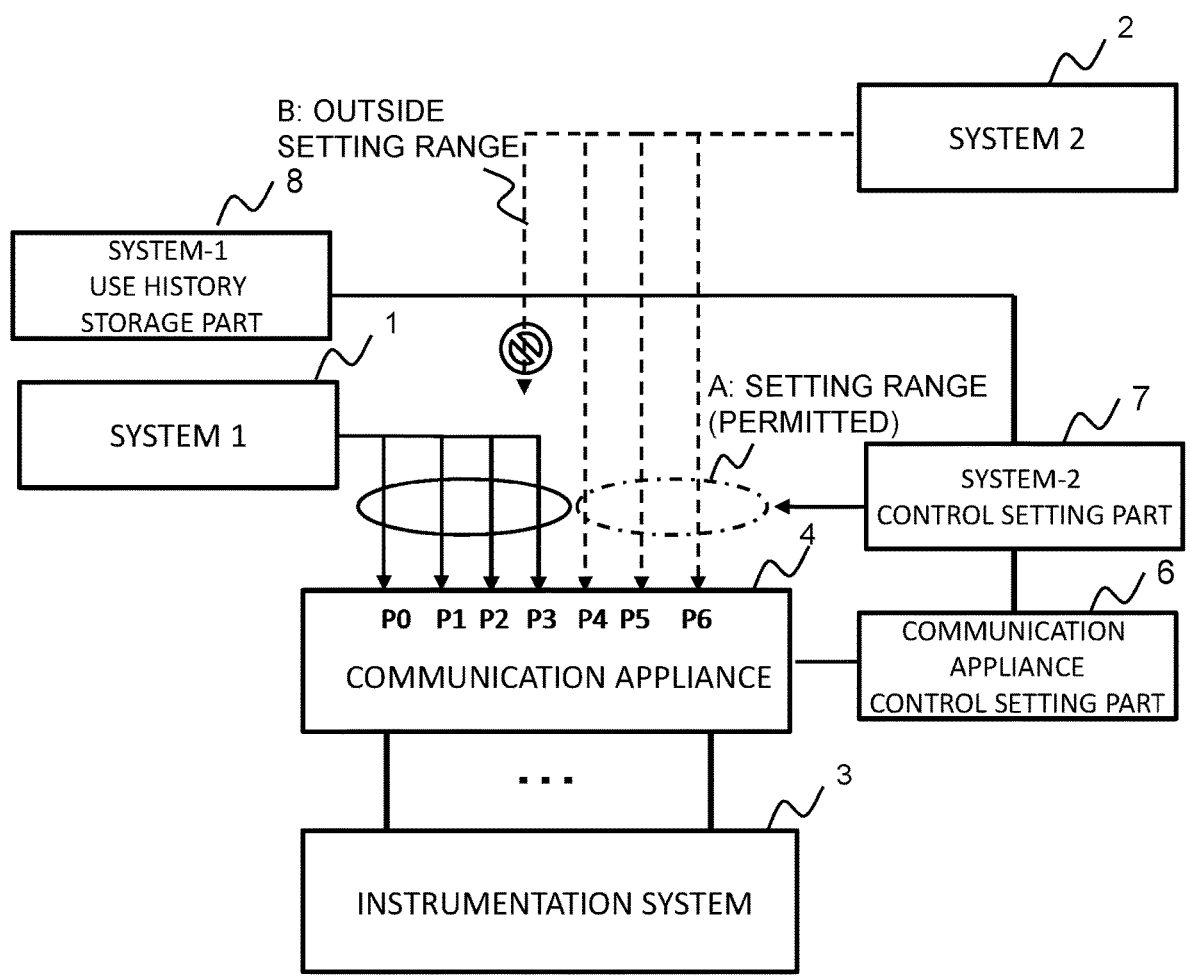
FIG. 5 a diagram illustrating an Example Embodiment of the present invention.

FIG. 5 illustrates an example according to an example embodiment in FIG. 4. As illustrated in FIG. 5, in addition to the configuration in FIG. 4, a system-1 use history storage part 8 is provided. The system-1 use history storage part 8 stores a use history of a communication path(s) used by the system 1. The system-1 use history storage part 8 may include a random access memory (RAM), an electrically erasable programmable read-only memory (EEPROM), a universal serial bus (USB) memory, a hard disk drive (HDD), or the like.

The system-1 use history storage part 8 stores a history of access from a node apparatus(es) (terminal(s)) not illustrated, in the system 1 to a port of the communication appliance 4. The history of access from a node apparatus(es) (terminal(s)) not illustrated, in the system 1 to a port of the communication appliance 4 may be collected, based on a MAC address (IP address) which is a source address of a frame (packet) received from the port.

Though not limited thereto, for example, the following information extracted from a frame (packet) header may be stored as the use history:
  source MAC address,
  destination MAC address,
  protocol,
  source IP address,
  destination IP address,
in case where an upper protocol is Transmission Control Protocol (TCP) or User Datagram Protocol (UDP),
  in addition to source port number and destination port number, the following information may also be stored as the use history:
  a log time,
  transmission and reception interfaces, and
  the number of packets belonging to the same flow.

As transmission and reception interfaces, the following information may be stored:
  IN and OUT port numbers, VLAN ID, etc. in case of layer-2 relay processing, and
  VLAN ID, etc. in case of layer-3 relay processing.

A logical element such as an alias name may be stored and managed in place of a port ID (identifier) such as a port number or the like.

The use history may be acquired by using a log function of the communication appliance 4. Alternatively, the use history may be acquired by using a function (called as a "Historian", for example) that stores, in time series, log of information collection and command transmission on the system 1 side. Alternatively, a packet (frame) forwarded between the system 1 and the communication appliance 4 may be collected by using a packet capture function.

The system-1 use history storage part 8 may use a storage apparatus such as a network management apparatus not illustrated. Alternatively, the system-1 use history storage part 8 may be included in the communication appliance 4.

The system-2 control setting part 7, by referring to use history of the system 1 stored in the system-1 use history storage part 8, determines a setting range usable by the system 2 (ports P5 and P6 in FIG. 4), and notifies the communication appliance control setting part 6 of the setting range. The communication appliance control setting part 6 sets, for example, an access control list (ACL) in the communication appliance 4 so that access control corresponding to the setting range usable by the system 2 can be performed.

Figure 6:
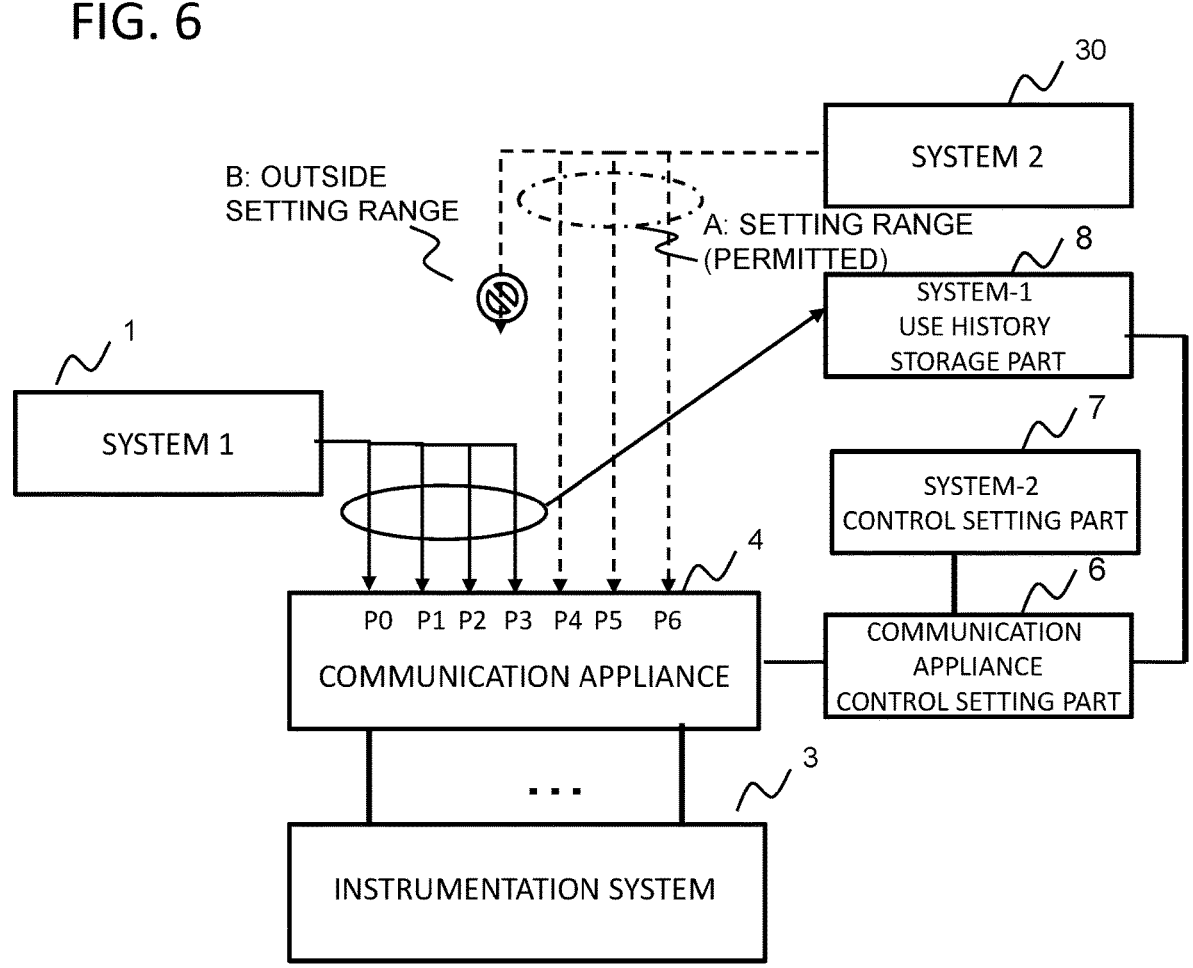
FIG. 6 a diagram illustrating a variation according to the Example Embodiment of the present invention.

FIG. 6 illustrates a variation of the configuration in FIG. 5. In FIG. 5, the system-2 control setting part 7 determines a setting range of a communication path(s) of the system 2 based on information about the use history of the system 1. However, the configuration of FIG. 6, regarding control of the system 2, does not need any change from those illustrated in FIGS. 1, 2A, and 2B.

As illustrated in FIG. 6, based on the information in the system-1 use history storage part 8 and the system-2 control setting part 7, the communication appliance control setting part 6 generates an ACL(s) to realize access control conforming to the setting range usable by the system 2 and sets the ACL(s) in the communication appliance 4.

Figure 1:
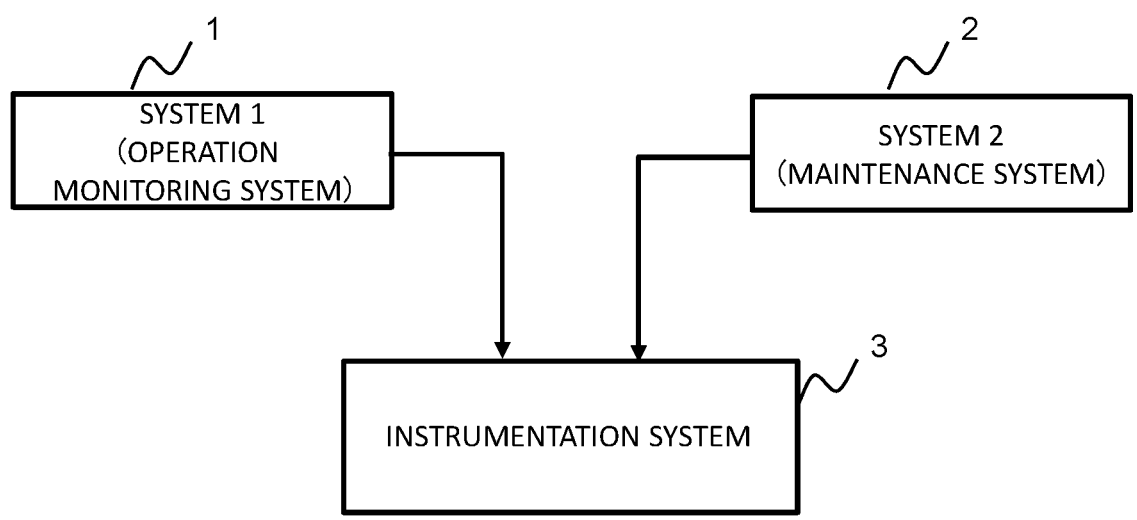
FIG. 1 is a diagram illustrating a typical system configuration according to a related technique.
Figure 7:
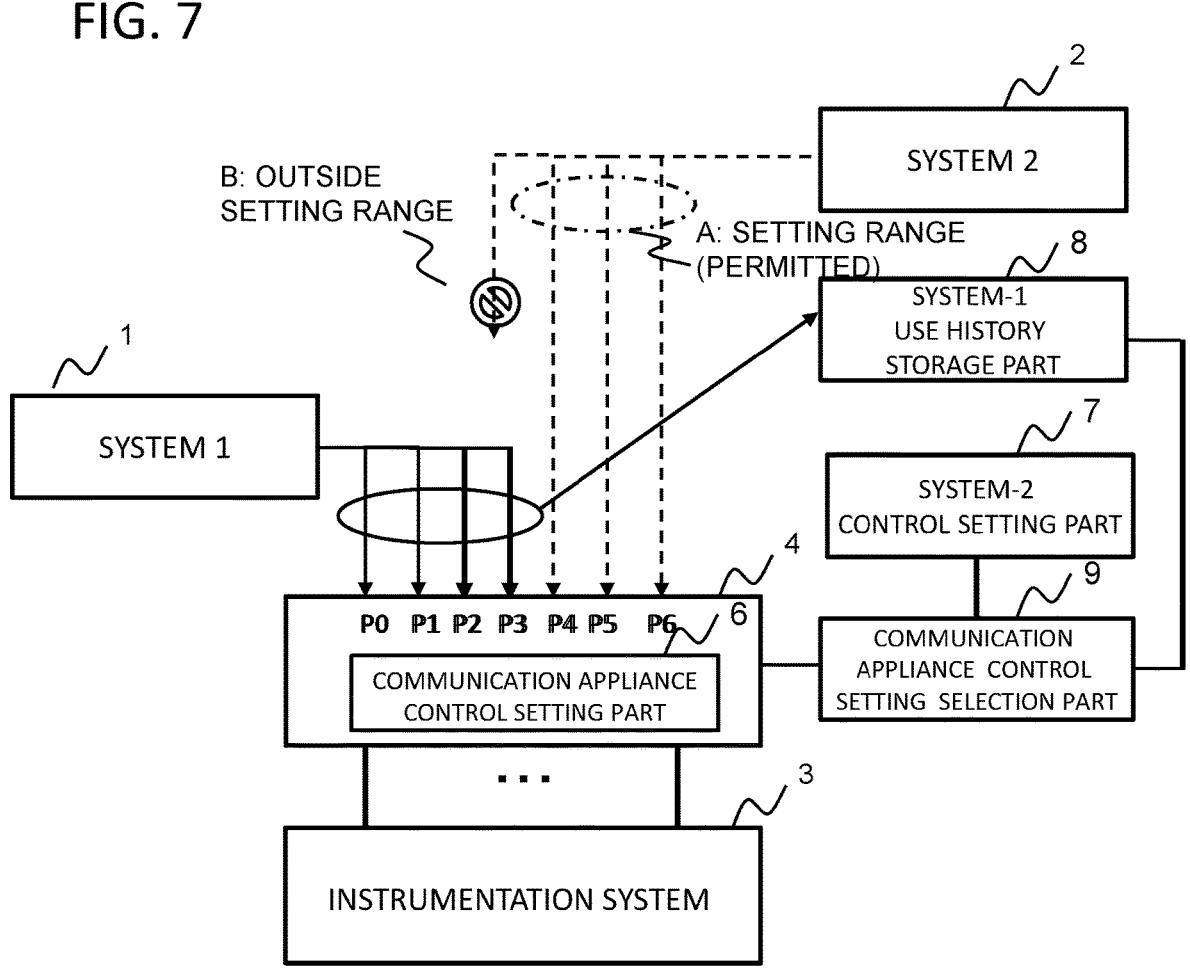
FIG. 7 a diagram illustrating a variation according to the Example Embodiment of the present invention.

FIG. 7 illustrates a variation of the configuration in FIG. 5. In FIG. 7, a communication appliance control setting selection part 9 is newly included. The communication appliance control setting selection part 9 filters setting information in the system-2 control setting part 7, based on the use history in the system-1 use history storage part 8 and sets resulting information in the communication appliance control setting part 6 included in the communication appliance 4. The control of the system 2 does not need any change from the configuration as illustrated in FIGS. 1, 2A, and 2B.

Figure 8:
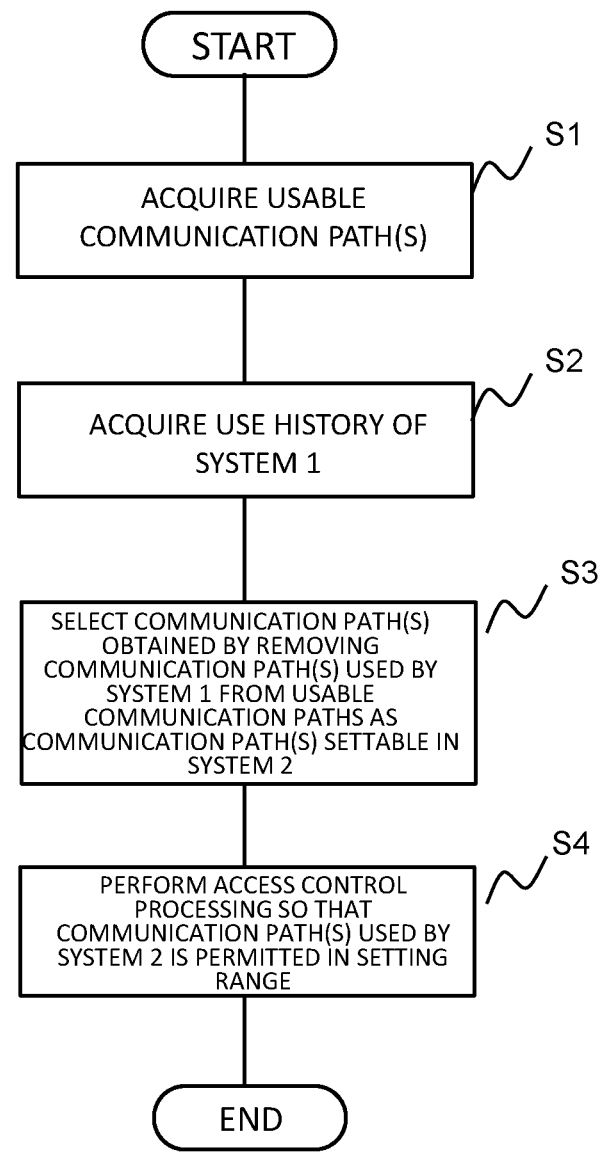
FIG. 8 is a flowchart illustrating a procedure according to an Example Embodiment of the present invention.

FIG. 8 illustrates a procedure (method) according to an example embodiment of the present invention. A port(s) usable by the communication appliance 4 is acquired (step S1). For example, by referencing a MAC address table included in the communication appliance 4, a port that is currently connected to a MAC address of a node in the system 1, is not a port usable by the system 2. In addition, a port that is currently connected to a terminal in the system 2 is not a port usable by the system 2, either. This step may be performed by the system-2 control setting part.

Next, information about the use history of the system 1 is acquired (step S2). For example, among available ports of the communication appliance 4, information about a port(s) that has previously been connected to a node(s) (a terminal(s)) in the system 1 is acquired.

Next, a communication path(s) obtained by removing a communication path(s) used by the system 1 from usable communication paths is selected as a communication path(s) settable in the system 2 (step S3). This step is performed by the system-2 control setting part 7, the communication appliance control setting part 6, or the communication appliance control setting selection part 9.

The communication appliance 4 performs control so that a frame (packet) from the system 2 is permitted only within the setting range.

Figure 9:
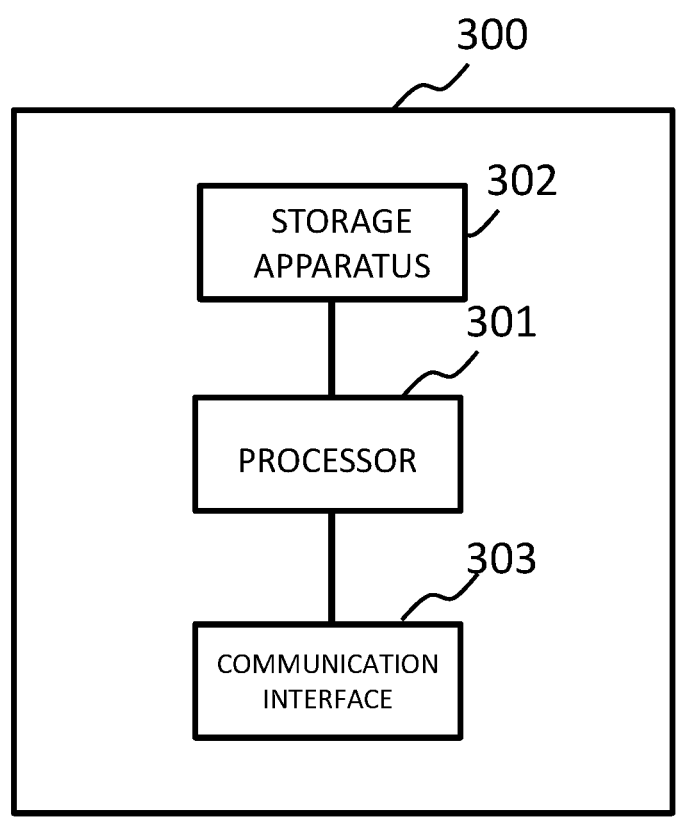
FIG. 9 a diagram illustrating a configuration of a computer apparatus according to an example embodiment of the present invention.

FIG. 9 illustrates a configuration of an example embodiment of the present invention. The functions of the communication appliance (switch) 4 may be implemented on a computer apparatus 300. As illustrated in FIG. 9, the computer apparatus 300 may include: a processor (a central processing unit (CPU) or a data processing apparatus) 301; a storage apparatus 302 including at least one of a semiconductor memory (e.g., a random access memory (RAM), a read-only memory (ROM), an electrically erasable and programmable ROM (EEPROM), or the like), a hard disk drive (HDD), a compact disc (CD), and a digital versatile disc (DVD); and a communication interface 303. The communication interface 303 corresponds to a port of a switch. The communication interface 303 may be constituted by a NIC(s), for example.

The storage apparatus 302 may store a program that realizes at least functions of the communication appliance control setting part 6. By reading and executing the program, the processor 301 executes processing for setting, based on use history of the system 1, a communication path(s) other than a communication path(s) used by the system 1 among usable communication paths as a communication path(s) that can be set ("permit" or "deny" can be set) in the system 2. A MAC address table, etc. managed by the communication appliance 4 may be stored in the storage apparatus 302.

In addition, the system-1 use history storage part 8 may be included in the storage apparatus 302.

The present example embodiment can provide a mechanism of preventing connection control on the system 2 from affecting the system 1. In this way, influence of connection control of the system 2 on the system 1 can be eliminated. In addition, regarding the function of performing control on the system 2, control as usual can be applied without considering impact on the system 1 each time the control is performed.

As a result, according to the present example embodiment, change of setting of the system 2 needs only approval from an administrator of the system 2.

The present example embodiment can eliminate need for approval from an administrator of the system 1 to change setting of the system 2 or can reduce time and effort for verification or the like, necessary for the change, even when an approval from an administrator of the system 1 is needed.

Thus, regarding change of the setting of the system 2, the present example embodiment enables, for example, change to a content that has never been set, dynamic change in coordination with information collection result, addition or removal of a new information collection function, a large amount of setting finely subdivided temporally or spatially, and significant reduction in lead time.

Thus, the present example embodiment reduces need for physically separating a communication appliance used for controlling the systems 1 and 2. Normally, when logicalization, adoption of Intelligent Technology (IT), or openization is applied to a communication appliance, it is difficult to make visual distinction, and problems may occur. However, the present example embodiment prevents these problems. Namely, the present example embodiment can facilitate application of logicalization, adoption of IT, standardization, aggregation, etc. to the communication appliance.

As described above, according to the present example embodiment, functions of managing different systems, which are the system 1 in which availability is of utmost importance and the system 2 in which security such as system protection is of importance, based on different control policies can coexist.

While, in the individual example embodiment described above, a system formed by the two systems of the systems 1 and 2 has been described, access control equivalent to that according to the above example embodiment can be performed on a system including three or more systems.

The disclosure of each of the above PTLs is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept.

What is claimed is:

1. A communication apparatus, comprising
one or more processors; and
one or more memories storing program instructions executable by the one or more processors, wherein the one or more processors are configured to execute the program instructions to
provide one or more communication paths between an instrumentation system and a first system that performs input and/or output for operating the instrumentation system using the one or more communication paths;
select and configure, when a maintenance on the instrumentation system from a second system is performed through the communication apparatus to the instrumentation system, at least a communication path from at least a communication path other than a communication path used by a first system, based on a use history of the communication path used by the first system to communicate with the instrumentation system via the communication apparatus; and
provide at least a communication path between an individual one of the first and second systems and the instrumentation system, the first system enabled to use the communication path used by the first system to communicate with the instrumentation system and not selected for the second system, when the second system uses the communication path selected and configured to perform the maintenance of the instrumentation system.

2. The communication apparatus according to claim 1, wherein the one or more processors are configured to
automatically generate a filter rule that does not permit access from the second system to the communication path used by the first system, out of communication paths usable by the communication apparatus, based on the use history of the first system and configure one or more communication path other than the communication path used by the first system as a setting range, access to the communication path within the setting range from the second system being permitted, and wherein
the one or more processors are configured to control whether to permit or block communication from the second system based on the filter rule.

3. A communication system, comprising:
the communication apparatus according to claim 1; and
a storage apparatus that holds the use history of the first system.

4. A control setting apparatus, comprising:
one or more processors; and
one or more memories storing program instructions executable by the one or more processors, wherein the one or more processors are configured to execute the program instructions to:
acquire, regarding a communication apparatus that provides communication paths between first and second systems and an instrumentation system, a use history of a communication path used by the first system that performs input and/or output for operating the instrumentation system using the one or more communication paths,
prohibit the second system from accessing the communication path used by the first system, and
select and configure, in the communication apparatus, when a maintenance on the instrumentation system from a second system is performed through the communication apparatus to the instrumentation system, at least a communication path from at least a communication path other than the communication path used by the first system to communicate with the instrumentation system via the communication apparatus, as a setting range, access to the communication path within the setting range from the second system being permitted, the first system enabled to use the communication path used by the first system to communicate with the instrumentation system and not selected for the second system, when the second system uses the communication path selected and configured to perform the maintenance of the instrumentation system.

5. The control setting apparatus according to claim 4, wherein
the second system includes
a maintenance terminal that performs input and/or output processing for a maintenance operation on the instrumentation system or on a field appliance.

6. A communication system, comprising:
the control setting apparatus according to claim 4;
a communication apparatus that provides a plurality of communication paths between the first and second systems and the instrumentation system; and
a storage apparatus that stores the use history of the first system.

7. A communication control method for a communication apparatus, the method comprising:
providing one or more communication paths between an instrumentation system and a first system that performs input and/or output for operating the instrumentation system using the one or more communication paths;
selecting and configuring, when a maintenance on the instrumentation system from a second system is performed through the communication apparatus to the instrumentation system, at least a communication path usable by the second system from at least a communication path other than a communication path used by the first system, based on a use history of the communication path used by the first system to communicate with the instrumentation system; and
providing at least a communication path between an individual one of the first and second systems and the instrumentation system, the first system enabled to use the communication path used by the first system to communicate with the instrumentation system and not selected for the second system, when the second system uses the communication path selected and configured to perform the maintenance of the instrumentation system.

8. The communication control method according to claim 7, comprising:
automatically generating a filter rule that does not permit access from the second system to the communication path used by the first system among communication paths usable based on a use history of the first system;
selecting and configuring one or more communication paths other than the communication path used by the first system to communicate with the instrumentation system, as a setting range, access to the communication path within the setting range from the second system being permitted; and
causing a communication apparatus to control whether to permit or block communication from the second system based on the filter rule.

9. The communication control method according to claim 8, wherein the second system includes a maintenance terminal that performs input and/or output processing for a maintenance on the instrumentation system or on a field appliance.

10. The communication control method according to claim 7, comprising:
   acquiring, regarding a communication apparatus that provides communication paths between the first and second systems and the instrumentation system, a use history of the communication path used by the first system; and
   setting at least a communication path other than the communication path used by the first system to communicate with the instrumentation system, as the communication path usable by the second system in the communication apparatus.

11. A non-transitory computer readable recording medium storing a program causing a computer that constitutes a communication apparatus to execute processing comprising:
   providing one or more communication paths between an instrumentation system and a first system that performs input and/or output for operating for operating the instrumentation system instrumentation system using the one or more communication paths;
   selecting and configuring, when a maintenance on the instrumentation system from a second system is performed through the communication apparatus to the instrumentation system, at least a communication path usable by the second system from at least a communication path other than a communication path used by a first system, based on a use history of the communication path used by the first system to communicate with the instrumentation system; and
   providing at least a communication path between an individual one of the first and second systems and the instrumentation system, the first system enabled to use the communication path used by the first system to communicate with the instrumentation system and not selected for the second system, when the second system uses the communication path selected and configured to perform the maintenance of the instrumentation system.

12. The non-transitory computer readable recording medium according to claim 11, storing the program causing the computer to execute processing comprising:
   automatically generating a filter rule that does not permit access from the second system to the communication path used by the first system among communication paths usable based on a use history of the first system;
   configuring one or more communication paths other than the communication path used by the first system as a setting range, access to the communication path within the setting range from the second system being permitted; and
   controlling whether to permit or block communication from the second system based on the filter rule.

13. The non-transitory computer readable recording medium according to claim 11, wherein
   the second system includes a maintenance terminal that performs input and/or output processing for a maintenance on the instrumentation system or on a field appliance.

* * * * *